US006201497B1

(12) United States Patent
Snyder et al.

(10) Patent No.: US 6,201,497 B1
(45) Date of Patent: Mar. 13, 2001

(54) ENHANCED GLOBAL NAVIGATION SATELLITE SYSTEM

(75) Inventors: David M. Snyder; Leslie D. Baych; Bruce D. Melick, all of Cedar Rapids, IA (US)

(73) Assignee: DLB Limited, Cedar Rapids, IA (US)

( * ) Notice: Subject to any disclaimer, the term of this patent is extended or adjusted under 35 U.S.C. 154(b) by 0 days.

(21) Appl. No.: 09/156,448

(22) Filed: Sep. 19, 1998

Related U.S. Application Data

(60) Provisional application No. 60/060,515, filed on Sep. 30, 1997.

(51) Int. Cl.[7] ....................................................... G01S 5/02
(52) U.S. Cl. ........................ 342/357.06; 342/357.08; 701/215
(58) Field of Search ........................ 342/357.06, 357.08; 701/215, 213

(56) References Cited

U.S. PATENT DOCUMENTS

| 4,833,480 | 5/1989 | Palmer et al. . |
| 5,192,957 | 3/1993 | Kennedy . |

(List continued on next page.)

FOREIGN PATENT DOCUMENTS

WO 95/21386 * 8/1995 (WO) ................................ G01S/5/14

OTHER PUBLICATIONS

Ndili, Awele; "GPS Pseudolite Signal Design"; Sep. 1994. Garmin Corporation webpage for eMap [retrieved on 2000–6–28], Retrieved from the Internet:<URL: http://www.garmin.com/products/emap/>, Unknown.*

(List continued on next page.)

*Primary Examiner*—Thomas H. Tarcza
*Assistant Examiner*—Fred H. Mull
(74) *Attorney, Agent, or Firm*—Allan L. Harms (57) ABSTRACT

An enhanced positioning and navigational system for use within a building or otherwise separated by a line-of-sight barrier from an orbiting global navigation satellite system such as Navstar GPS. An antenna placed at a known location within line of sight of orbiting global navigation satellites receives global position and navigation signals and relays the signals through the line-of-light barrier to an identifier which identifies the signals and couples the signals for individual broadcast from each of an array of broadcast antennae located at known fixed locations within the building (behind the line-of-sight barrier). A receiver located within the building receives the signals broadcast from the antenna array and through use of a processor interprets the signals to provide position and navigation information to the user of the receiver.

In an alternate embodiment, a signal generator generates navigation and positions information signals of a multiplicity of broadcast beacons. The information signals are separated into parcels corresponding to individual beacons and then are separately broadcast from each of all array of antennae located at fixed, known locations within a building. A radio position and navigation receiver equipped with a processor provided with appropriate software receives the signals and provides radio position and navigation receiver information to the user of the GPS receiver. In another alternative embodiment, plural pseudolites are placed at accurately established fixed locations within a building. A controller causes the pseudolites to sequentially broadcast global navigational satellite system signals. A GPS receiver equipped with a processor provided with appropriate software receives the signals and provides navigation and positioning information to the user of the GPS receiver. Alternative methods for sequencing the signals broadcast by the pseudolites are also disclosed.

10 Claims, 4 Drawing Sheets

U.S. PATENT DOCUMENTS

| | | |
|---|---|---|
| 5,359,521 | 10/1994 | Kyrtsos et al. . |
| 5,384,574 | 1/1995 | Counselman, III . |
| 5,438,337 | 8/1995 | Aguado . |
| 5,446,465 | 8/1995 | Diefes et al. . |
| 5,528,248 * | 6/1996 | Steiner et al. .................. 342/357.06 |
| 5,570,097 | 10/1996 | Aguado . |
| 5,815,114 | 9/1998 | Speasl et al. . |
| 5,952,958 * | 9/1999 | Speasl et al. .................. 342/357.08 |

OTHER PUBLICATIONS

Garmin Corporation webpage for StreetPilot ColorMap [retrieved on 2000–6–28]. Retrieved from the Internet:<URL: http://www.garmin.com/products/colorMap/>, Unknown.*

Garmin Corporation webpage for NavTalk [retrieved on 2000–6–28]. Retrieved from the Internet:<URL: http://www.garmin.com/products/navTalk/>, Unknown.*

Pretec Electronic Corp. webpage for CompactGPSGarmin [retrieved on 2000–6–28]. Retrieved from the Internet:<URL: http://www.pretec.com/index2/product/Mobile_peripherals/CompactGPS.htm>, Unknown.*

* cited by examiner

ENHANCED GLOBAL NAVIGATION SATELLITE SYSTEM

CROSS REFERENCE TO CO-PENDING PROVISIONAL APPLICATION

This application claims the benefit under 35 U.S.C. §119 (e) and 37 C.F.R. §1.78 of copending provisional patent application entitled "Enhanced Global Position System", Ser. No. 60/060,515 filed Sep. 30, 1997, from which this application claims priority. The disclosure of provisional patent application Ser. No. 60/060,515 is hereby incorporated in its entirety.

BACKGROUND OF THE INVENTION

The present invention relates generally to facilitating the use of radio signals for positioning and navigation where a barrier (solid or non-solid) precludes direct usage of public line-of-sight radio positioning/navigation beacons. Although several embodiments of the present invention are described herein, the focus is on the use of repeated geometrically non-linear Global Navigation Satellite System signals within a line-of-sight barrier.

DISCUSSION OF THE PRIOR ART

A common need of our society is to accurately track and record positions of aircraft, land vehicles, geographical landmarks, materials, buildings, animals, people, and other items. One system currently used to accomplish this goal in direct line-of-sight is use of public radio positioning/navigation signals and associated equipment. Radio positioning/navigation can be broadly defined as the use of radio waves to transmit information, which in turn can then be received and utilized to determine position and to navigate. Some radio positioning/navigation systems currently in use are Loran, Omega, LMN, DGPS, and Global Navigation Satellite Systems (GNSS) such as NAVSTAR, GLONASS (the Russian variant), and European systems (GNSS1, GNSS2, NAVSTAT and GRANAS). The radio navigation systems quickly becoming the standard worldwide are Global Navigation Satellite Systems (GNSS) including, in the United States, the NAVSTAR Global Positioning System.

The NAVSTAR GPS signal transmission system presently consists of twenty-four orbiting satellites, spaced in six separate circular orbits, with each accommodating four satellites. Of these, twenty-one are normally operational and three serve as spares. Each NAVSTAR GPS satellite reappears above the same ground reference approximately every twenty-three hours and fifty-six minutes. The spacing of satellites is designed to maximize probability that earth users will always have at least four satellites in good geometrical view for navigational use.

The basic method of position determination via radio positioning and navigation signals derives from the concept of triangulation. The term triangulation used herein refers to the general process of determining distance, a.k.a. range, from the present position to multiple known beacons, and mathematically solving for the point in space which satisfies these conditions. As applied to GNSS, the procedure requires calculation of signal travel time, which, when multiplied by the speed of light, renders distance.

In support of this computation, the normal radio signals transmitted by each broadcasting NAVSTAR GPS satellite are currently configured as follows: a 1575.42 MHZ "L1" carrier modulated by the 10.23 MHZ P-code (Precision), the 1.023 MHZ C/A-code (Coarse/Acquisition), and the 50 Hz navigation code; and a 1227.60 MHZ "L2" carrier modulated by the 10.23 MHZ P-code and the 50 Hz navigation code. Because the system was principally designed for military use, the P-code is classified, and the L2 carrier is not officially supported for civilian use.

Each satellite repeats its pre-defined, unique 1023-bit C/A-code every millisecond. This code identifies the sending satellite and, since the pattern is exactly known, the code-point at which the signal arrives serves as a marker for estimating arrival time (complex algorithms are applied for refining measurement accuracy).

The NAVSTAR GPS navigation message transmits various data including precise time information every six seconds, orbital parameters (ephemeris data), correction statistics, and satellite status. The basic data is divided among five frames over thirty seconds, with the total message spread over 12.5 minutes. The layout of data is designed such that once a receiver has accumulated the necessary background data, it acquires an update of precise time every six seconds from which navigation calculations can be made. The position of the satellite at time of transmission is computed based on its known orbital path along with current ephemeris data.

Initial range calculations are called "pseudoranges" since receiver clocks are not precisely synchronized to NAVSTAR GPS time, and propagation through the atmosphere introduces delays into the navigation signal propagation times. These result, respectively, in clock bias error and atmospheric bias error. Clock bias errors may be as large as several milliseconds.

Conventionally, a minimum of four GNSS satellites are sampled to determine a terrestrial position estimate (e.g. Cartesian X,Y,Z coordinates; or longitude, latitude, and altitude in any of various systems including WGS84, NAD83, NAD27, Indian, etc.). Three of the satellites are used for basic triangulation, and a fourth is used to solve for clock bias between the satellite system and the receiver. Ephemeris correction statistics from the navigation message assist in amelioration of atmospheric bias.

Other errors which affect GNSS position computations include receiver noise, signal reflections, shading, satellite path shifting, and in the case of NAVSTAR GPS, purposely induced accuracy degradation called selective availability (S/A).

A process known as differential positioning compensates for many of the errors which are common in radio positioning/navigation systems. An antenna at a known location receives line-of-sight (LOS) GNSS signals and broadcasts a signal with current correction adjustments for each satellite which can be received by any differential receiver within its signal range.

Location accuracy via GNSS is continually evolving. Standard GNSS receivers can typically produce position estimates within ±60–100 meter accuracy. Sub-meter accuracy of location can be achieved using differential positioning, known as DGPS. Some other techniques for improving accuracy are "Carrier-phase GPS", "Augmented GPS", and GPS Interferometry.

GNSS relies on no visual, magnetic, or other point of reference and this is particularly important in applications such as aviation and naval navigation that traverse polar regions where conventional magnetic navigational means are rendered less effective by local magnetic conditions. Magnetic deviations and anomalies common in standard radio positioning/navigation systems do not hinder GNSS. In addition, GNSS equipment is typically fabricated of standard, solid state electronic hardware, resulting in low cost, low maintenance systems, having few or no moving parts, and requiring no optics. GNSS does not have the calibration, alignment, and maintenance requirements of conventional inertial measuring units. Also, GNSS is available 24 hours per day on a worldwide basis.

During the development of the NAVSTAR GPS program the United States Government made decisions to extend its use to both domestic and international communities. Its applications range from navigation over the land, in the air, and on the seas, to precision surveys, the tracking of trains and trucks, and even locating undetonated mines left behind in the Gulf War. It is important to note that GNSS solutions are only accomplished when the GNSS receiver is in direct line-of-sight (LOS) with the orbiting GNSS satellites. In other words, if the GNSS receiver's antenna is used in heavily forested areas, in steep and narrow canyons, within a structure, or adjacent to the outer walls of buildings, the GNSS receiver will be unable to obtain a good repeatable reading, or in many cases, any reading at all.

What is needed is a system that relays GNSS signals beyond a line-of-sight barrier (LSB) and mathematically corrects satellite pseudorange calculations to account for geometrically nonlinear satellite signal paths. The result of such a system is accurate, consistent readings for multitudes of applications which need, or require, positioning and navigation information when out of the line of sight of a GNSS satellite system.

SUMMARY OF INVENTION

The present invention provides a system for use of GPS receivers separated by a barrier from being in the line of sight of orbiting GNSS satellites, hereinafter referred to as "within a line-of-sight barrier". An exterior receiving antenna is positioned outside the line-of-sight barrier at a known location to receive ephemeris and pseudorange signals from a GNSS system of orbiting satellites. Optional correction signals from a DGPS antenna may also be used. The signals received by the exterior antenna are passed through the line-of-sight barrier, such as a building roof, to a signal identifier which identifies and may amplify the signals and then transmits the signals to a plurality of broadcast antennae placed at known locations within the line-of-sight barrier, preferably at differing spacings from the ceilings of the building in which the invention is being employed. Each of the broadcast antennae broadcasts the identified signals either sequentially or at different frequencies. A standard GPS receiver capable of receiving GPS and optional DGPS signals may be co-positioned with the exterior antenna. The retransmitted signals are received by a GPS receiver coupled to a host computer. Allowance for the displacement of the signal path from a linear path to a three-dimensional multilegged path is made by the host computer in order that the data received by the GPS receiver operating within the line-of-sight barrier is used to calculate the position into that which would be received by the receiver if no roof or other line-of-sight barrier interrupted the line-of-sight path of the GPS signals transmitted by the orbiting GNSS satellites.

In an alternate embodiment of the invention, a plurality of broadcast antennae located within a building emit signals imitative of a GNSS system of satellites. Line-of-sight data received by GPS receivers located in the building from any four of the broadcast antennae permit the GPS receivers to display or transmit location, altitude and navigational data while in line-of-sight range of any four interior broadcast antennae.

Accordingly, it is the primary objective of the present invention to extend the current use of the existing line-of-sight GNSS system to locations within a line-of-sight barrier.

The present invention specifically comprises a receiver with antenna positioned in direct line-of-sight of a public radio positioning/navigation transmission system (e.g. GNSS, NAVSTAR GPS, GLONASS). The acquired signals are passed through the line-of-sight barrier, identified, amplified (as needed), and relayed to a strategically arrayed constellation of broadcast antennae. The radio positioning/navigation receiver located within a line-of-sight barrier receives the repeated, geometrically non-linear signals and utilizes appropriate software to calculate its coordinates within a line-of-sight barrier, to be used for positioning and navigational purposes.

The present invention utilizes the following: GPS receiving antenna, signal identifier/amplifier/repeater (IAR), GPS broadcast only antennas, GPS receivers, supplemental data links and a host computer/data processor, GPS signal processing software, and three-dimensional, parametric, database-driven, geometric solution software (vector geometry). Optionally, a DGPS receiving antenna and DGPS receivers may be used for enhanced accuracy.

The primary method of accomplishing the objective utilizes geometrically non-linear, non line-of-sight, repeated GPS signals to calculate accurate location data for applications within a line-of-sight barrier (LSB).

The primary invention is an accurate extension of GPS from a line-of-sight only (LOS) to a system that can be used within a line-of-sight barrier (LSB) which derives data from the GPS satellite signals and the optional DGPS correction signals, which are passed through a line-of-sight barrier (LSB), and used in conjunction with a supplemental data link and a host computer/data processor.

The system derives accurate position information from line-of-sight data signals directly from the GPS satellites, and optional DGPS antennae at a fixed receiver location outside the line-of-sight barrier (LSB). The GPS receiver operating in line-of-sight view of the GPS satellites then transmits positional data to a host computer database. Simultaneously, the signals are passed through the line-of-sight barrier (LSB) to a signal identifier/amplifier/repeater (IAR). After the signals are identified, they are sent to a set of broadcast antennas located at known fixed locations, contained within the line-of-sight barrier (LSB). The receiver within the line of sight barrier (LSB) then directly receives the repeated, passed through GPS signals that can be processed and used within the line-of-sight barrier (LSB) for location and navigation purposes that are ultimately only an extension of an existing GPS.

Alternatively, a secondary general configuration is a more self-contained system that will create line-of-sight positioning data within a line-of-sight such as a building. This secondary solution to the present invention will employ its own master clock, a host computer/data processor, GPS broadcast-only antennas, signal amplifiers, supplemental data links, GPS signal processing software, and specially programmed three-dimensional, parametric, database-driven, geometric solution software, and GPS receivers.

It is an object of the invention to utilize GNSS satellite radio positioning/navigation signals which have been acquired outside a line-of-sight barrier.

It is a further object of the invention to pass GNSS satellite signals through a line-of-sight barrier.

It is still a further object of the invention to identify, distribute by means of switching in a controlled manner, amplify, and re-radiate the GNSS satellite signals within a line-of-sight barrier.

It is still a further object of the invention to use a GNSS receiver made from commercially available hardware, to receive geometrically non-linear, GNSS satellite signals within a line-of-sight barrier.

It is still a further object of the invention to integrate commercially available processor hardware and software to collect standard GNSS signals and associated data to calculate positioning and navigation solutions within a line-of-sight barrier.

It is still a further object of the invention to utilize GPS information for recording the locations of people, resources, products, inventory, work-in-process all outside the line of sight of the global navigation satellite system satellites.

These and other objects will be better understood from review of the detailed description which follows and in which the following definitions are applicable.

DEFINITIONS

Global Navigation Satellite System (GNSS)—A generic term for specific systems such as the Russian GLONASS and the United States NAVSTAR GPS, utilizing equipment which receives signals from a relevant constellation of navigational satellites in earth orbit.

NAVSTAR Global Positioning System (NAVSTAR GPS)—The United States Government's satellite navigation system which broadcasts time and ranging data globally. Designed to provide a highly accurate, reliable, continuous 24-hour, worldwide coverage for position reporting and navigation.

Differential Global Positioning System (DGPS) or Differential Global Navigation Satellite System (DGNSS)—A positioning system which also includes an antenna that is precisely surveyed to a known location. The antenna receives GPS signals and broadcasts current correction data for each satellite which can be received by a DGPS antenna. Location accuracy within one meter can be achieved.

Time of Arrival (TOA)—A broadcast beacon sends out a signal starting at some precise instant in time and a receiver which acquires the signal at some later point in time. This time difference is the TOA.

Time Delay (TD)—The total time a signal is delayed, versus straight line through a vacuum, as it travels from one fixed location to another.

Line-of-Sight—(LOS) Unobstructed linear signal path between radio positioning/navigation transmitters and receiving antennae.

Line-of-Sight Barrier—(LSB) Any barrier, solid or non-solid, that restricts direct linear receipt of any radio positioning/navigation signal.

Radio Frequency (RF)—Radio transmission of data.

Selective Availability (S/A)—The Military dithers the satellite clock and manipulates ephemeris data to deny navigational precision to potential adversaries. These errors, in turn, lead to a reduction in precision of position estimates.

Simulated Global Navigation Satellite System (SGNSS)—GNSS satellite data which is generated and broadcast within a line-of-sight barrier.

Radio Positioning/Navigation Signal (RPNS)—Any radio positioning/navigation signal, such as LORAN, OMEGA, etc. broadcast within a line-of-sight barrier.

Receiver—Hardware that is capable of receiving radio positioning/navigation signals Processor
  a. Integrated Processing System (IPS)—A radio positioning/navigation receiver with an integrated solution processor.
  b. External Processing System (EPS)—A radio positioning/navigation receiver that is linked via RF or hardwire to an external computer data processor.

Geographical Information System (GIS)—Any information system that is designed to work with data referenced by spatial or geographic coordinates. A GIS is both a database system with specific capabilities for spatially-referenced data, as well as a set of operations for mapping and analyzing the data.

Wide Area Augmentation System (WAAS)—A system where a network of ground reference stations monitors GNSS satellite signals and passes the information to a Master Station. The Master Station uplinks correction data to Geostationary satellites (not the GNSS navigation satellites) which in turn downlink the correction data to a user's GNSS receiver. This system is designed to improve integrity, accuracy, availability, and continuity of service, with a view to accuracy being compatible with aircraft approach and landing aids, and other uses where such accuracy is required.

Triangulation—Any mathematical procedure to calculate position based on the intersection of ranges from known points (includes all variations such as trilateration and resection, etc., whether or not angles, per se, are used).

DETAILED DESCRIPTION OF THE INVENTION

The present invention is now described with reference to the figures wherein like reference numbers denote like elements.

The present invention is a system which can fulfill the position/navigation accuracy of locating a radio positioning/navigation receiver operating within a line-of-sight barrier 100 using passed through, geometrically non-linear radio positioning/navigation signals. In the preferred embodiment of the present invention, this is accomplished by utilizing standard, and/or modified, radio positioning/navigation hardware and integrating commercially available software into a signal and data processor without the need for additional data or communication.

In describing the various embodiments of the present invention references will be made to a preferred embodiment and illustrative advantages of the invention. Several alternative embodiments of the present invention will also be illustrated in the following discussion. However, those skilled in the art and familiar with the instant disclosure of the present invention will recognize additions, deletions, modifications, substitutions, and other changes which will fall within the purview of the subject inventions and claims.

Figure 1:
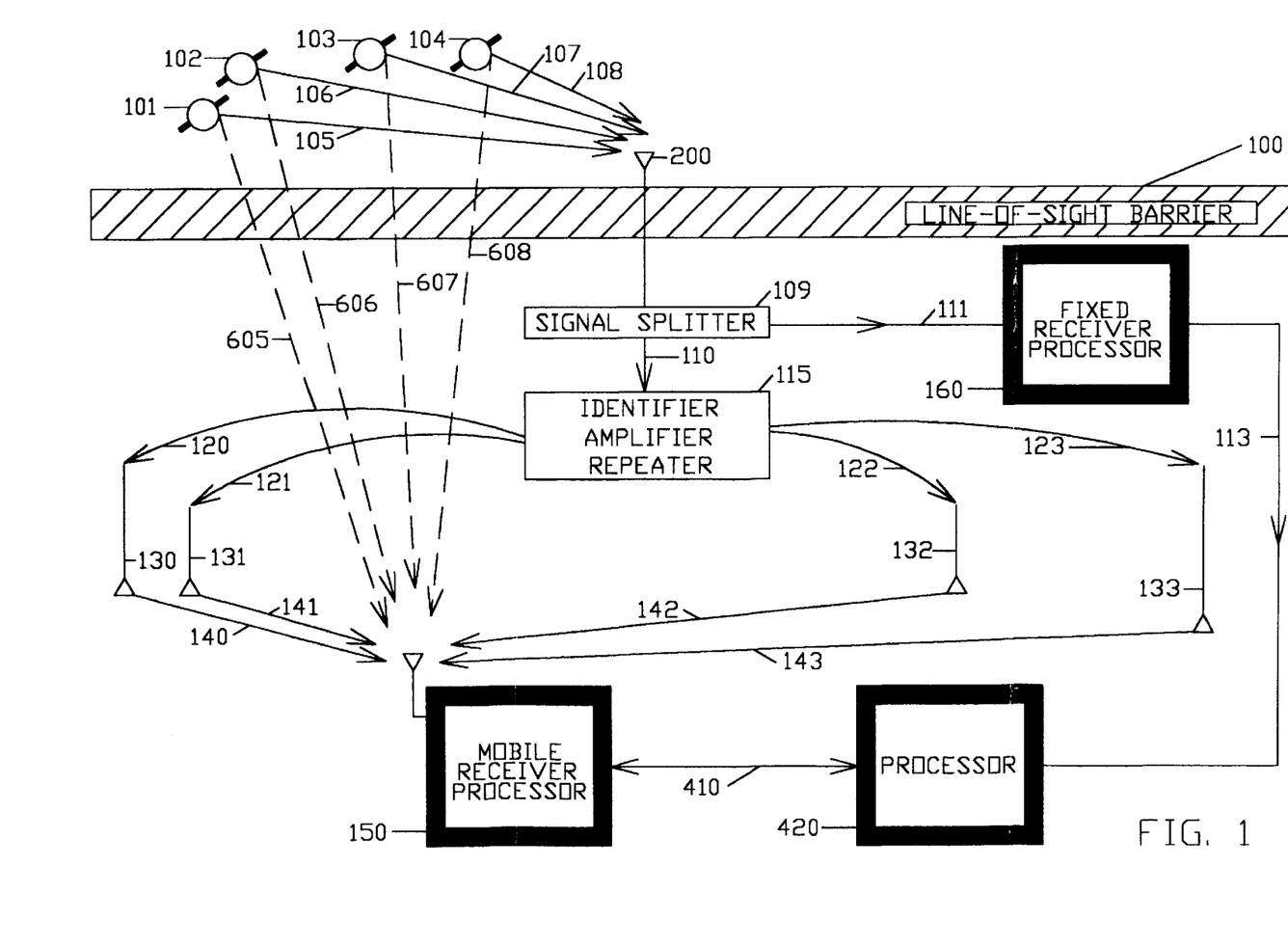
FIG. 1 is a schematic representation of the preferred embodiment of the invention wherein location and time data from GNSS satellites is transmitted through a line-of-sight barrier, identified, amplified and rebroadcast from an array of antennae to any receiving unit within the line-of-sight barrier.

FIG. 1 illustrates the general configuration of the preferred embodiment of the present invention of a radio positioning/navigation system which is operating within a solid or non-solid line-of-sight barrier 100. Examples of a solid line-of-sight barrier 100 include the roof of a structure, a heavy tree canopy, steep and narrow canyon walls, the walls of tall buildings, or within any enclosure. Examples of non-solid line-of-sight barriers 100 would include, but are not limited to, atmospheric anomalies, magnetic fields, etc.

The basic necessary elements of this system used to determine the positioning and navigational coordinates of a radio positioning/navigation receiver operating within a line-of-sight barrier 100 include: a constellation of broadcast antennae 130, 131, 132, 133 accurately surveyed to fixed, known locations relative to the user's choice of system coordinates, and a mobile receiver/processor 150 operating within the line-of-sight barrier 100 within line of sight of the broadcast antennae 130, 131, 132, 133. The broadcast antennae 130, 131, 132, 133 are arranged in a geometrical pattern that is efficient for accurate triangulation with either a two- or three-dimensional radio positioning/navigation system, as applicable. Specifically, it should be noted that in a two-dimensional system the operating centers of the antennae are not all located co-linear, and in a three-dimensional system the operating centers of the antennae are not all located co-linear or co-planar. The transmission paths 140, 141, 142, 143 are direct line-of-sight distances from the fixed, known location, broadcast antennae 130, 131, 132, 133 to any mobile receiver/processor 150 which is operating within the line-of-sight barrier 100. A fixed receiver/processor 160 with appropriate software uses data received from GNSS antenna 200, to collect external pseudorange data, and transmits via transmission path 113 to processor 420. The mobile receiver/processor 150 with appropriate software, uses the radio positioning/navigation signals received from the broadcast antennae 130, 131, 132, 133 to collect total time of arrival of the signal from the satellites 101, 102, 103, 104. This data is transmitted via transmission path 113 to processor 420. Specifically, in a three-dimensional system the operating center of the antennae cannot all be located co-planar. The transmission paths 140, 141, 142, 143 are direct line-of-sight distances from the broadcast antennae 130, 131, 132, 133 to the mobile receiver/processor 150 which is operating within line-of-sight barrier 100. The processor 420 with appropriate software, uses the data collected from mobile receiver/processor 150 and fixed receiver/processor 160 to determine the present coordinates of mobile receiver/processor 150 by appropriate two- or three-dimensional geometric triangulation.

The preferred embodiment of the present invention illustrated in FIG. 1 focuses on the use of repeated, geometrically non-linear extension of GNSS signals within a line-of-sight barrier 100. Twelve or more GNSS satellites may be in line of sight of the GNSS antenna 200. At any one time only four satellites are needed for three-dimensional position determination, and are thus shown for clarity (more or fewer may be used in applications as desirable). These satellites are labeled as 101, 102, 103, 104. The fixed receiver/processor 160 may be located inside or outside the line-of-sight barrier 100. The GNSS signals are passed through the line-of-sight barrier 100, split by signal splitter 109, and transmitted via transmission paths 110 and 111 to the Identifier/Amplifier/Repeater 115 and receiver/processor 160 respectively. These transmission paths 110 and 111 may be either hard wired, or wireless. Transmission path 110 will cause individual time delays of the satellite signals which are being repeated. These delays in time must be factored into the calculation of the positioning and navigational coordinates for the mobile receiver/processor 150 operating within a line-of-sight barrier 100.

The Identifier/Amplifier/Repeater 115 identifies the individual GNSS satellites 101, 102, 103, 104 by any of the following methods either singularly or in combination: splitting, tuning, heterodyning and deheterodyning (frequency shifting), tagging within the GNSS navigation signal. In one variation, the Identifier/Amplifier/Repeater 115 may separate the GNSS signals into identified separate signals corresponding to the individual signal sets received from each of satellites 101, 102, 103, 104. The Identifier/Amplifier/Repeater 115 amplifies, and selects a channel to transmit the passed through satellite data via transmission paths 120, 121, 122, 123 to broadcast antennae 130, 131, 132, 133 respectively.

Re-radiating GNSS signals simultaneously from multiple indoor broadcast antennae is subject to a "near-far" problem. This problem arises because of the large variation of the user-to-broadcast antennae range. The average power being received from the GNSS space vehicles remains approximately constant due to the large distance of the space vehicles from the GNSS receiver(s). On the other hand, the broadcast antenna power from broadcast antennae 130, 131, 132, 133 varies a great deal, inversely proportional to the square of the GNSS receiver's distance from the broadcast antennae, and can overwhelm incoming GNSS satellite vehicle signals. A unique aspect of all embodiments of this invention is the sequencing of GNSS satellite vehicle signals in a controlled pattern to the broadcast antennae 130, 131, 132, 133 located with the line-of-sight barrier 100. In this way the "near-far" problem is eliminated. Another way to eliminate this problem is heterodyning and deheterodyning the signal to different frequencies for each of the broadcast antennae 130, 131, 132, 133. The mobile receiver/processor 150 is designed to handle GNSS satellite vehicle data coming from the sequenced broadcast through the indoor array of broadcast antennae 130, 131, 132, 133.

These broadcast antennae 130, 131, 132, 133 are selectively located at fixed, known locations relative to the user's choice of system coordinates. The transmission paths 120, 121, 122, 123 cause individual time delays of the satellite signals which are being passed through the Identifier/Amplifier/Repeater 115 and repeated within the line-of-sight barrier 100. Passage of signals through the Identifier/Amplifier/Repeater 115 causes an individual time delay that must also be factored into the calculation to determine the positioning and navigational coordinates of the mobile receiver/processor 150 operating within the line-of-sight barrier 100. The transmission paths 140, 141, 142, 143 are direct line-of-sight distances from the broadcast antennae 130, 131, 132, 133 to the mobile receiver/processor 150 which is operating within the line-of-sight barrier 100.

In order to calculate the position of a mobile receiver/processor 150 operating within a line-of-sight barrier 100, normal vector geometry techniques are utilized. The position/navigation solution of the mobile receiver/processor 150 is relative to the location of the broadcast antennae 130, 131, 132, 133 located within a line-of-sight barrier 100. The solution calculates the standard Cartesian X,Y,Z coordinates, or latitude/longitude/altitude, or customized local coordinate systems. For those versions of the invention which involve relaying public navigation/position signals and retransmitting them within a line-of-sight barrier 100 (as opposed to signal generation within the line-of-sight barrier 100), a unique innovation is incorporated into the triangulation algorithm in order to account for the geometrically non-linear signal path. The core of the solution resides in use of the real space, three-dimensional, parametric, database driven, graphical solution software.

For one skilled in the art, the following describes the essential characteristics of a type of three-dimensional, parametric, database driven, graphical solution software which may be employed in the invention:

Works in real size (one-to-one scale);

Works three-dimensionally using vector geometry (Cartesian X,Y,Z coordinates);

Works with GIS mapping overlays and can apply the elements of time;

Works in real time;

Works with database variables which can be applied to the three-dimensional, parametric, database driven, graphical solution models;

Works with parameters as algebraic input;

Works by representing the specific positioning and navigational results graphically.

Figure 4:
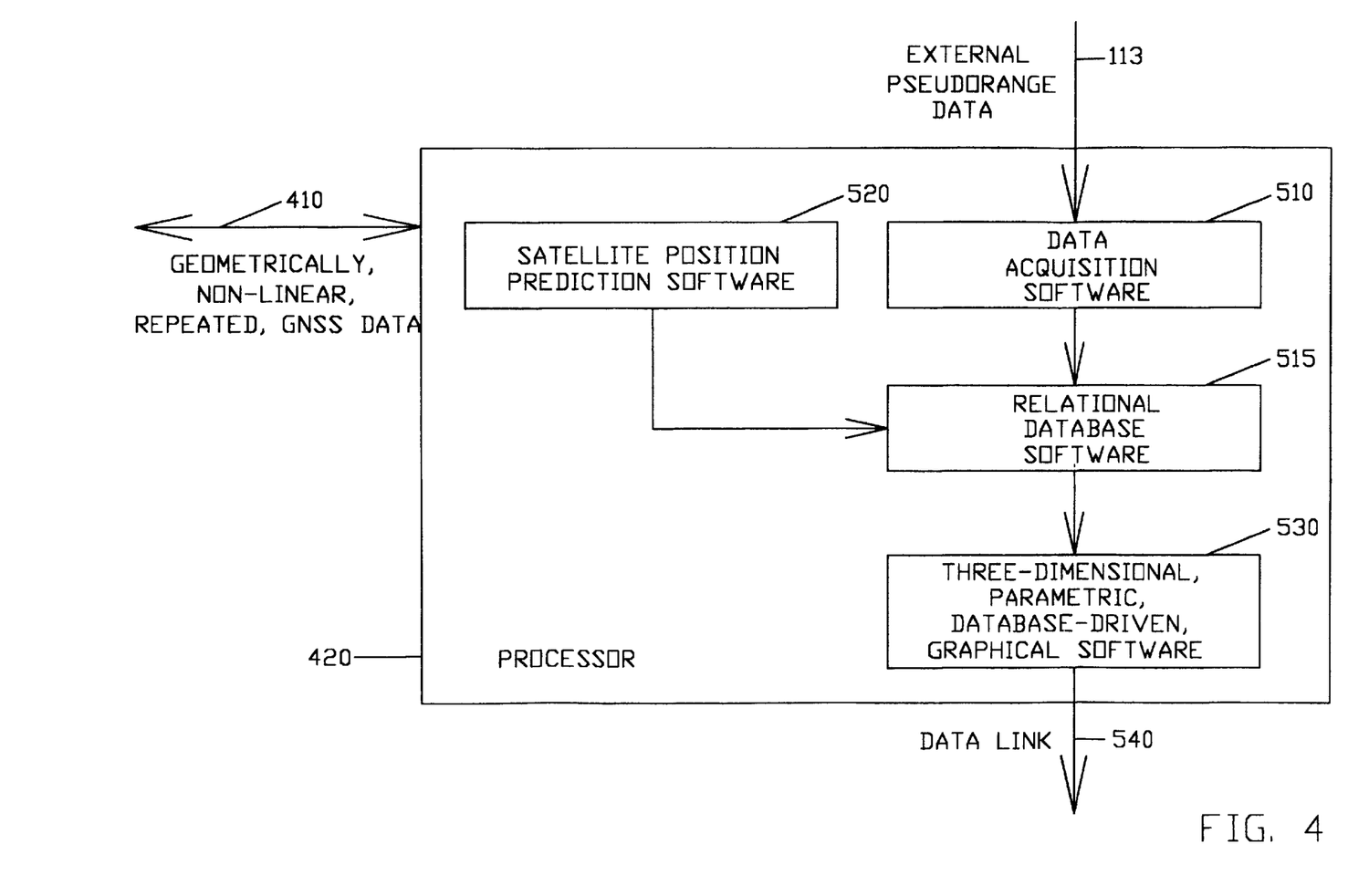
FIG. 4 is a schematic representation of the interrelated components within the processor unit employed within the system invention.

FIG. 4 illustrates the processor 420 which receives the geometrically non-linear, repeated GNSS data via transmission path 410 within a line-of-sight barrier. Processor 420 receives external pseudorange data via transmission path 113. Processor 420 uses data acquisition software (DAQ) 510, relational database management software 515, satellite position prediction software 520, and three-dimensional, parametric, database-driven, graphical software 530 which will calculate a post-processed solution of the repeated, geometrically non-linear GNSS or radio positioning/navigation signals which have been passed through line-of-sight barrier. Processor 420 may be a personal computer capable of operating the "Windows 95" operating system of Microsoft Corp. and may be of the type equipped with a Pentium processor operating at no less than 100 MHz and having internal memory of at least 16 megabytes. Processor 420 may be internal or external. An external processor may be shared with multiple mobile receiver/processors 150.

The following commercially available software may be employed by processor 420 for the functions described above:

Data Acquisition software (DAQ) 510:
Magellan GPS Post Processing Software published by Magellan System;
Relational Database Management System software (RDMS) 515:
Oracle published by Oracle Corp.;
Paradox published by Corel Corp.;
Fox Pro published by Microsoft Corp.;
Dbase supported by Inprise Corp.;
Access published by Microsoft Corp.;
GNSS Satellite Position Prediction Software 520 (Optional):
SatNAV Toolbox published by GPSoft Inc.;
Jupiter 4.0 published by Position Inc.;
Aslab published by Accord Software System.
Three Dimensional, Parametric, Database Driven, Graphical software 530:
AutoCAD Mechanical Desktop published by Autodesk, Inc.;
Solidworks published by Solidworks Inc.;
Matlab published by Mathworks Inc.

The above-referenced software may be integrated utilizing the following "Windows" Programming Development Tools:

Delphi published by Inprise Corp.
Visual Basic published by Microsoft Corp.
C++ Builder published by Inprise Corp.

The above referenced software is compatible with a variety of network operating systems including Windows 95, Windows 98, Windows NT, UNIX, and Novell Netware.

FIG. 4 also represents the processor 420 which is receiving a plurality of GNSS satellite or other public RF navigation/positioning geometrically non-linear signals which are transmitted via transmission path 410. The processor 420 collects the radio positioning/navigation data elements which include satellite pseudorange, satellite vehicle identification, time tags, GNSS week, GNSS time, GNSS almanac data, longitude, latitude, and altitude, which are contained or derived from satellite signals which are transmitted via transmission path 410. The processor 420 uses information generated by the GNSS satellite prediction software 520, and any optional differential data. The data acquired from the DAQ software 510 and the GNSS satellite prediction software 520 is exported directly to the relational database management software 515. The data is then categorized into appropriate fields of information in various data tables by the relational database management software 515.

The appropriate template or model created for the defined space within a line-of-sight barrier is used by the three-dimensional, parametric, database-driven, graphical software 530 which is driven by data exported by the relational database management software 515. The three-dimensional, parametric, database-driven, graphical software 530 solves the position/navigation location of mobile receiver/processor 150 operating within line-of-sight barrier 100.

The positioning/navigation location solution data are digitally output via data link 540 in various formats and utilized by other radio positioning/navigation receiver(s) operating within or outside of a line-of-sight barrier, by GIS software, or a host computer database.

FIG. 4 illustrates the post processed solution to the position/navigation coordinates (X11, Y11, Z11) of mobile receiver/processor 150 within the line-of-sight barrier 100.

To further understand the calculations and data needed to solve the position/navigation locations of a mobile receiver/processor 150 within a line-of-sight barrier 100 using repeated, geometrically non-linear signals, the following data elements must be determined:

constants of time delays (represented by three-dimensional, parametric, database-driven, graphical software 530 as curvilinear parameters) arising from the following:
Transmission path from antenna 200 to Identifier/Amplifier/Repeater 115;
Processing by the Identifier/Amplifier/Repeater 115;
Identifier/Amplifier/Repeater 115 to broadcast antennae 130, 131, 132, 133 via transmission paths 120, 121, 122, 123;
location coordinates (represented by three-dimensional, parametric, database-driven, graphical software 530 as earth centered Cartesian coordinates) of the following:
GNSS antenna 200 (coordinates are represented by X5,Y5,Z5);
Identifier/Amplifier/Repeater 115 (coordinates are represented by X6,Y6,Z6);
Broadcast antenna 130 (coordinates are represented with X7,Y7,Z7);

Broadcast antenna 131 (coordinates are represented with X8,Y8,Z8);

Broadcast antenna 132 (coordinates are represented by X9,Y9,Z9);

Broadcast antenna 133 (coordinates are represented by X10,Y10,Z10).

The following data element is an optional factor which may be determined when accuracy enhancement is desired: differentially measured variables (time of transmission) for each GNSS satellite 320.

The total signal distance or total time of arrival (TOA) that mobile receiver/processor 150 acquired from the various non-linear signal transmission paths consists of the following equations where $T_n$=elapsed time for signal travel over transmission path n:

From satellite 101 to mobile receiver/processor 150 via broadcast antenna 130

$$T_{105}+T_{110}+T_{115}+T_{120}+T_{140}=\text{Total TOA from Satellite 101}$$

From satellite 101 to mobile receiver/processor 150 via broadcast antenna 131

$$T_{106}+T_{110}+T_{115}+T_{121}+T_{141}=\text{Total TOA from Satellite 101}$$

From satellite 101 to mobile receiver/processor 150 via broadcast antenna 132

$$T_{107}+T_{110}+T_{115}+T_{122}+T_{142}=\text{Total TOA from Satellite 101}$$

From satellite 101 to mobile receiver/processor 150 via broadcast antenna 133

$$T_{108}+T_{110}+T_{115}+T_{123}+T_{143}=\text{Total TOA from Satellite 101}$$

All of the above data elements are known except for external pseudoranges 105, 106, 107, 108, and the lengths of transmission paths. Upon the acquisition or prediction of the external pseudoranges 105, 106, 107, 108 by the fixed receiver/processor 160 or satellite position prediction software 520, the problem will be reduced to one set of unknowns, namely lengths of transmission paths 140, 141, 142, 143 respectively for each of the above equations. Simple subtraction will yield the solution of the unknowns for the length of these transmission paths 140, 141, 142, 143.

Once the external pseudorange 105 from Satellite 101 is known, the distance or total time of arrival from the broadcast antennae 130, 131, 132, 133 to mobile receiver/processor 150 can be determined by the following equations:

for Satellite 101: (via broadcast antenna 130)

$$T_{140}=\text{Total TOA from Satellite 101}-(T_{110}+T_{115}+T_{120}+T_{105})$$

for Satellite 101: (via broadcast antenna 131)

$$T_{141}=\text{Total TOA from Satellite 101}-(T_{110}+T_{115}+T_{121}+T_{106})$$

for Satellite 101: (via broadcast antenna 132)

$$T_{140}=\text{Total TOA from Satellite 101}-(T_{110}+T_{115}+T_{122}+T_{107})$$

for Satellite 101: (via broadcast antenna 133)

$$T_{140}=\text{Total TOA from Satellite 101}-(T_{110}+T_{115}+T_{123}+T_{108})$$

An alternate calculation for the total signal distance or total time of arrival (TOA) that mobile receiver/processor 150 acquired from the various non-linear signal transmission paths consists of the following equations where $T_n$=elapsed time for signal travel over transmission path n:

From satellite 101 to mobile receiver/processor 150

$$T_{105}+T_{110}+T_{115}+T_{120}+T_{140}=\text{Total TOA from Satellite 101}$$

From satellite 102 to mobile receiver/processor 150

$$T_{106}+T_{110}+T_{115}+T_{121}+T_{141}=\text{Total TOA from Satellite 102}$$

From satellite 103 to mobile receiver/processor 150

$$T_{107}+T_{110}+T_{115}+T_{122}+T_{142}=\text{Total TOA from Satellite 103}$$

From satellite 104 to mobile receiver/processor 150

$$T_{108}+T_{110}+T_{115}+T_{123}+T_{143}=\text{Total TOA from Satellite 104}$$

All of the above data elements are known except for external pseudoranges 105, 106, 107, 108, and the lengths of transmission paths. Upon the acquisition or prediction of the external pseudoranges 105, 106, 107, 108 by the fixed receiver/processor 160 or satellite position prediction software 520, the problem will be reduced to one set of unknowns, namely lengths of transmission paths 140, 141, 142, 143 respectively for each of the above equations. Simple subtraction will yield the solution of the unknowns for the length of these transmission paths 140, 141, 142, 143.

Once the external pseudoranges 105, 106, 107, 108 from Satellites 101, 102, 103, 104 are known, the distances or total time of arrival from the broadcast antennae 130, 131, 132, 133 to mobile receiver/processor 150 can be determined by the following equations:

for Satellite 101:

$$T_{140}=\text{Total TOA from Satellite 101}-(T_{110}+T_{115}+T_{120}+T_{105})$$

for Satellite 102:

$$T_{141}=\text{Total TOA from Satellite 102}-(T_{110}+T_{115}+T_{121}+T_{106})$$

for Satellite 103:

$$T_{142}=\text{Total TOA from Satellite 103}-(T_{110}+T_{115}+T_{122}+T_{107})$$

for Satellite 104:

$$T_{143}=\text{Total TOA from Satellite 104}-(T_{110}+T_{115}+T_{123}+T_{108})$$

The three-dimensional, parametric, database-driven, graphical software 530 determines the coordinates (X11, Y11,Z11) of the mobile receiver/processor 150 located within a line-of-sight barrier 100 by using the following process steps:

a. The position of the mobile receiver/processor(s) 150 is represented by earth-centered coordinates (X11,Y11, Z11). These coordinates are determined by intersecting spheres which have radii equal to the internal pseudoranges 140, 141, 142, 143 which emanate respectively from fixed known location broadcast antennae 130, 131, 132, 133.

b. Once that the position (X11,Y11,Z11) of receiver(s) 150 has been solved, the parametric graphical solution software 530 can calculate by using normal three-dimensional vector geometry the calculated pseudoranges 605, 606, 607, 608 from the satellites 101, 102,103, 104 by knowing the earth-centered Cartesian X,Y,Z coordinates of each satellite 101, 102, 103, 104 and the earth-centered Cartesian coordinates of any mobile receiver/processor 150 operating within the line-of-sight barrier 100.

The earth-centered Cartesian coordinates (X11,Y11,Z11) which represent position, or discreet locations which can be averaged over time for navigation purposes or representations, may be transferred via data link 540 in multiple ways to various types of equipment in order to make the positioning/navigation data useful. The following are examples and are not all inclusive:

GIS maps for two- and/or three-dimensional positioning and navigational purposes.

Host computer with database for positioning and navigational analysis.

Broadcast to another mobile receiver/processor 150.

Although the forgoing detailed description of the preferred embodiment of the present invention describes specific use of GNSS satellites, it is to be understood that certain aspects thereof are not limited solely to use with such satellite systems and may be used with signals received from other sources. Two alternative embodiments of the present invention are described in the detailed description of FIGS. 2 and 3.

Figure 2:
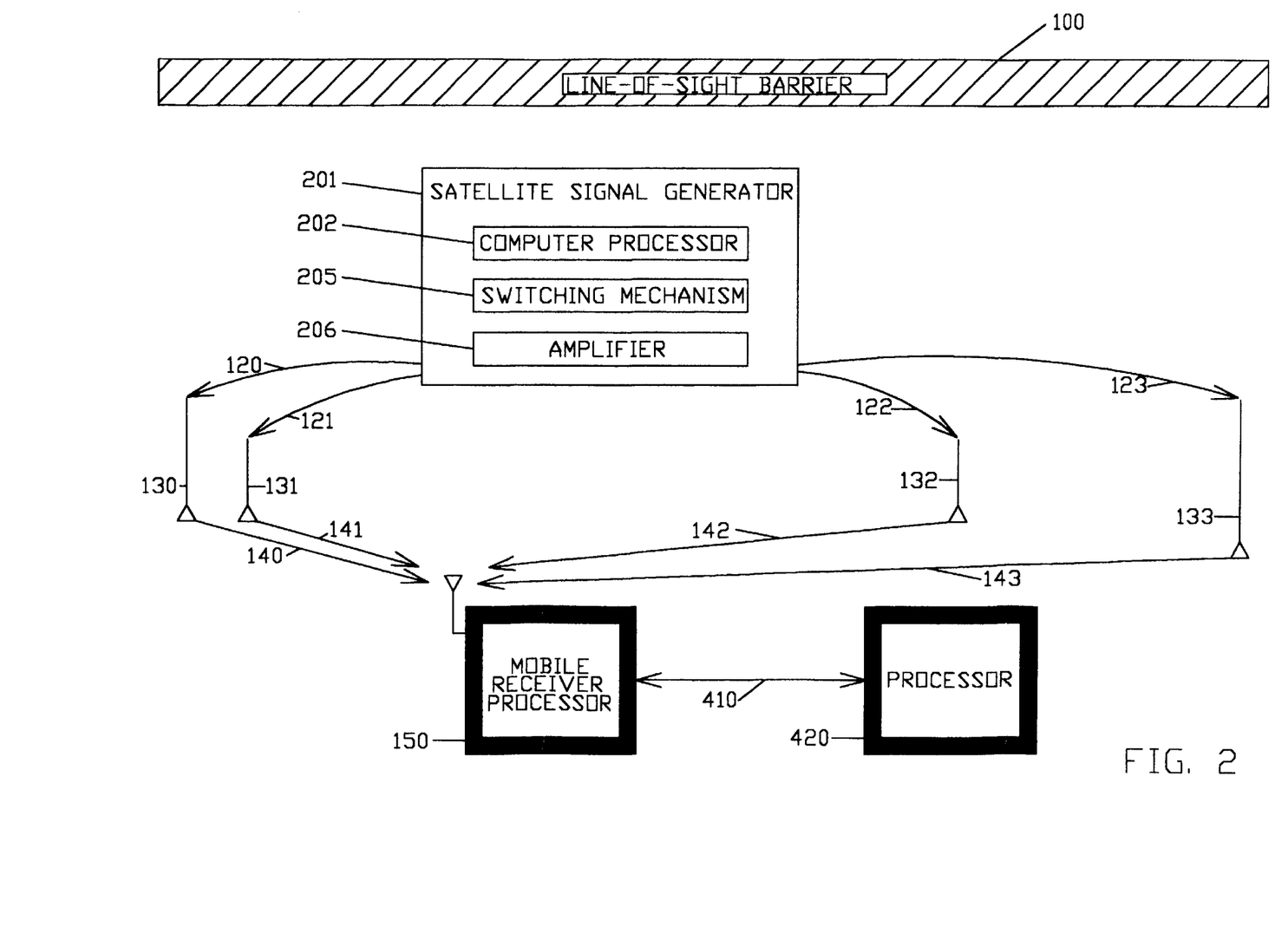
FIG. 2 is a schematic representation of an alternative embodiment of the invention which is deployed entirely within a line-of-sight barrier.

FIG. 2 illustrates an alternative embodiment of the present invention which focus on the use of repeated, geometrically non-linear extensions of simulated GNSS (GNSS) signals, or any radio positioning/navigation signals (RPNS) within a line-of-sight barrier 100. In the first alternative embodiment of the present invention illustrated in FIG. 2, the SGNSS or RPNS signals are software generated and synchronized using a high grade clock. The satellite signal generator 201 is comprised of a computer/processor 202 with appropriate software that creates SGNSS or RPNS signals. The signal generator is outfitted with software that provides the logic to drive a switching mechanism 205. After the SGNSS or RPNS signals pass through the switching mechanism 205 they are amplified by a signal amplifier 206. This software will compute SGNSS or RPNS signal data as if it were received at the fixed location in space of the signal generator 201. This point simulates a SGNSS or RPNS receiving antenna and is necessary to provide a point of reference for collecting the SGNSS or RPNS data and simulating passing it through a line-of-sight barrier 100.

The signal generator 201 selects a channel to transmit the simulated satellite data via transmission paths 120, 121, 122, 123 to broadcast antennae 130, 131, 132, 133 respectively. These broadcast antennae 130, 131, 132, 133 are accurately surveyed to fixed known locations relative to the user's choice of system coordinates. The transmission paths 120, 121, 122, 123 will cause individual time delays of the SGNSS or RPNS signals. The transmission paths 140, 141, 142, 143 are direct LOS distances from the fixed, known location, broadcast antennae 130, 131, 132, 133 to the mobile receiver/processor 150 which is operating within a line-of-sight barrier 100. The mobile receiver/processor 150 with appropriate software, uses the SGNSS or RPNS signals received from the broadcast antennae located at fixed, known locations 130, 131, 132, 133, via the transmission paths 140, 141, 142, 143 located within the line-of-sight barrier 100 to determine its present coordinates by appropriate triangulation.

Figure 3:
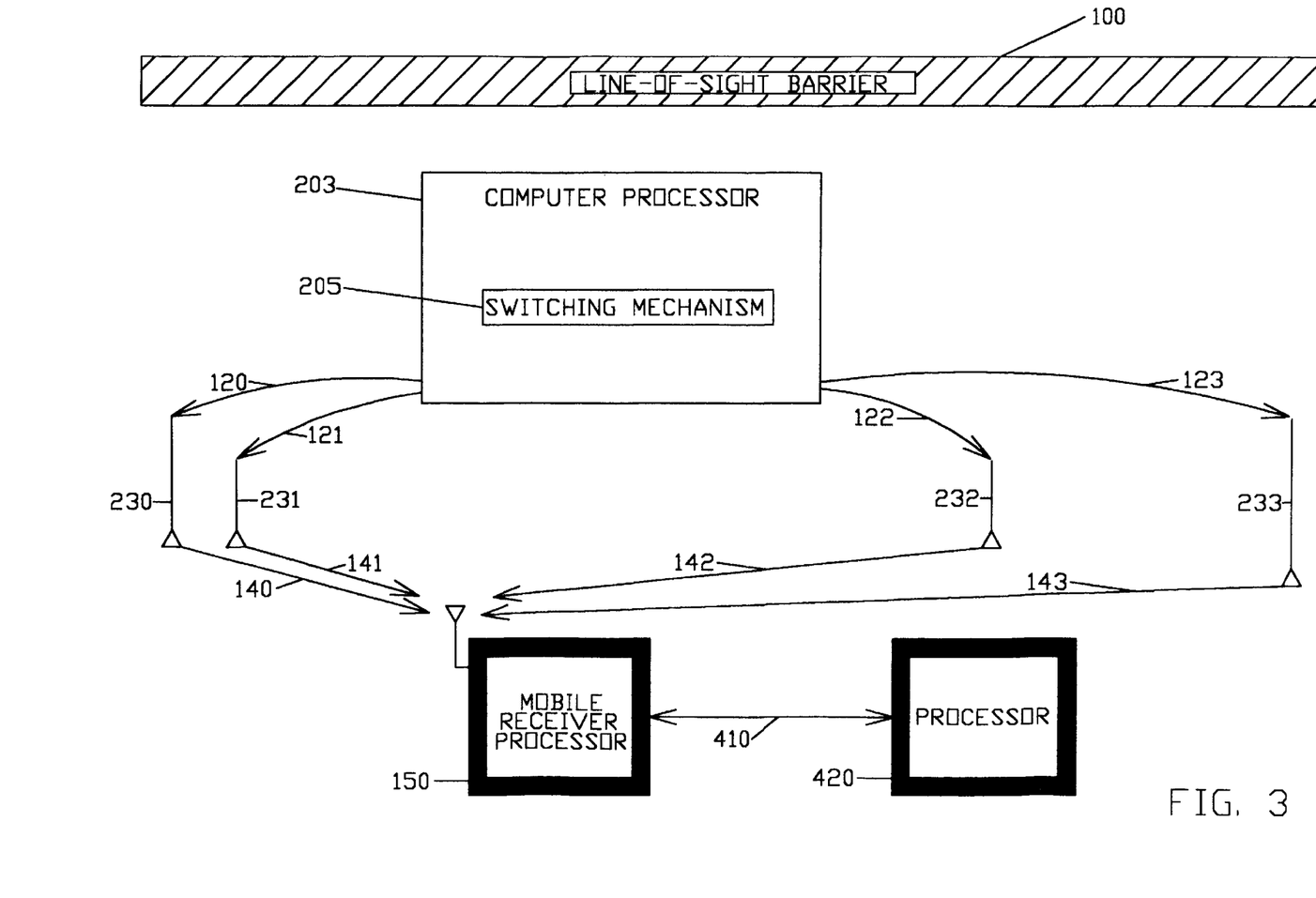
FIG. 3 is a schematic representation of another alternate embodiment of the invention similar to the alternate embodiment of FIG. 2.

FIG. 3 illustrates the second alternative embodiment of the present invention. This second alternate embodiment also focuses on the use of GNSS signals or radio positioning navigation signals within a line-of-sight barrier 100. The combination of a transmitting antenna and signal generator is commonly referred to in the art as a pseudolite. Associated with each pseudolite 230, 231, 232, 233 within the line-of-sight barrier 100 is a satellite signal generator, which comprises a hardware subassembly similar to the signal generation section of a GNSS satellite (commercially available from companies such as Stanford Telecom). The pseudolites are synchronized with a computer/processor 203 outfitted with a high grade clock and power switching mechanism 205.

Computer/processor 203 outfitted with a high grade clock and power switching mechanism 205 distributes power or a signal to initiate power via transmission paths 120, 121, 122, 123 to pseudolites 230, 231, 232, 233 respectively. These pseudolites 230, 231, 232, 233 are accurately surveyed to fixed known locations relative to the user's choice of system coordinates. The transmission paths 120, 121, 122, 123 will cause individual time delays of the sequenced power distribution. The transmission paths 140, 141, 142, 143 are direct LOS distances from the fixed, known location, pseudolites 230, 231, 232, 233 to the mobile receiver/processor 150 which is operating within a line-of-sight barrier 100. The mobile receiver/processor 150 with appropriate software, uses the GNSS positioning/navigation signals received from the pseudolites 230, 231, 232, 233, via the transmission paths 140, 141, 142, 143 located within the line-of-sight barrier 100 to determine its present coordinates by appropriate triangulation.

Differential accuracy enhancements are determined and may be applied to the various embodiments of the present invention. These differential corrections provide enhanced accuracy of the positioning/navigation data received within the line-of-sight barrier 100. The process known as differential positioning compensates for many of the errors which are common in radio positioning/navigation systems. An antenna at a known location receives line-of-sight GNSS signals and broadcasts a signal with current correction adjustments for each satellite which can be received by any differential receiver within its signal range. Location accuracy via GNSS is continually evolving. Standard GNSS receivers can typically produce position estimates within ±60–100 meter accuracy. Sub-meter accuracy of location can be achieved using differential positioning, known as DGPS.

The DGNSS base station computes its position based on the current satellite data it is receiving. This computed position is compared to the known position of the DGNSS antenna. The time differences are calculated for each satellite currently in line-of-sight. These corrections are transmitted to any DGNSS receiver/processor for enhanced accuracy.

While certain embodiments of the system for providing GPS signals to receiver/processors operating within a line-of-sight barrier are described in detail above, it is contemplated that variations and modifications will be developed within the teaching of the present disclosure.

What is claimed is:

1. Apparatus to determine the position of a GPS receiver separated by a line-of-sight barrier from a global navigational system having a plurality of satellites orbiting the earth, each of said satellites transmitting distinct navigational signals, comprising a first antenna for receiving said navigational signals from said satellites, a receiver/processor coupled to said first antenna, said receiver/processor calculating location and navigation information from said navigational signals, a signal identifier coupled to the first antenna, said signal identifier identifying said navigational signals received by said first antenna and separating said navigational signals received by said first antenna into a multiplicity of separate data signals, each of said separate data signals identical to one of said distinct navigational signals transmitted by said plurality of satellites, a plurality of broadcast antennae disposed within said line-of-sight barrier at fixed, predetermined locations, each of said broadcast antennae coupled to said signal identifier to receive one of said separate data signals, each of said separate data signals broadcast by one of said individual broadcast antennae distinct from said other of said data signals transmitted by said other of said individual broadcast antennae, said signal identifier causing each of said broadcast antennae to broadcast said identified navigational signals in a manner distinguishable from the broadcast of said identified navigational signals by the other of said broadcast antennae, a first computer coupled to said GPS receiver to receive said separate data signals received by said GPS receiver, said first computer coupled to said receiver/processor to receive location and navigation information therefrom, said first computer programmed to calculate a navigational result from each of said identified signals received by said GPS receiver and from said location and navigation information from said receiver/processor.

2. The apparatus of claim 1 wherein a receiver/processor is coupled to said first antenna to receive said navigational signals from said first antenna, said receiver/processor is coupled to said first computer for communication of data therebetween.

3. A method to determine the position of a GPS receiver separated by a line-of-sight barrier from a global navigational system which includes a plurality of satellites orbiting the earth which transmit navigational data, each of said plurality of satellites transmitting a distinct signal, comprising the steps of receiving said navigational data from said plurality of satellites at a known location exterior to said line-of-sight barrier, processing said navigational data to determine location and navigation information, separating said received navigational data into a plurality of separate data signals, each of said separate data signals being identical to a one of said distinct signals transmitted by said plurality of satellites, causing broadcast of said navigational data from a plurality of separate known locations, said broadcast of said navigational data distinguishable among each of said separate known locations, said broadcast at each of said separate known locations being of a distinct one of said plurality of separate data signals, computing a position of said GPS receiver from said navigational data broadcast from said plurality of separate known locations and from said location and navigation information.

4. The method of claim 3 wherein said broadcast of said navigational data from said plurality of separate known locations comprises broadcast of said navigational data at a different frequency for each of said separate known locations.

5. The apparatus of claim 3 including the further step of receiving a signal from a differential global positioning source at said known location exterior to said line-of-sight barrier, causing broadcast of said signal from said differential global positioning source from said plurality of broadcast antennae.

6. A system for providing position and navigational information to a first unit which is separated by a line-of-sight barrier from a global navigational system, the global navigational system including a plurality of satellites orbiting the Earth which transmit navigational signals, the system comprising first antenna means mounted within the line of sight of at least three of said plurality of satellites for receiving navigational signals from said at least three of said satellites, a receiver/processor coupled to said first antenna means, a plurality of broadcast antennae disposed within the line of sight of said first unit and coupled to said first antenna means, each of said plurality of broadcast antennae disposed at a predetermined location, means for broadcasting of said received navigational signals from each of said broadcast antennae such that broadcast of said navigational signals by one of said broadcast antennae is distinguished from broadcast of said navigational signals by the others of said broadcast antennae, each of said broadcast antennae transmitting a distinct one of said navigational signals received by said first antenna means without modification thereof, said first unit having a GPS receiver/processor associated therewith, said GPS receiver/processor capable of receiving said navigational signals, a host computer coupled to said GPS receiver/processor to receive said navigational signals received by said GPS receiver/processor, said host computer coupled to said receiver/processor to receive location and navigation data therefrom, said host computer programmed to calculate location and navigation information of said first unit from said navigational signals received by said GPS receiver.

7. The system of claim 6 wherein said means for broadcasting of said received navigational signals from each of said broadcast antennae comprises causing each of said broadcast antennae to broadcast at a time different than the others of said broadcast antennae.

8. The system of claim 6 wherein a signal identifier is coupled to the first antenna for receiving the navigational signals received by said first antenna and separating said navigational signals into a multiplicity of separate data signals, each of said data signals corresponding to one of said at least three of said satellites, each of said broadcast antennae coupled to said signal identifier to receive one of said separate data signals and to broadcast said one of said separate data signals.

9. A method to determine the position of a GPS receiver separated by a line-of-sight barrier from a global navigational system which includes a plurality of earth-orbiting satellites which transmit navigational data, comprising the steps of receiving said navigational data from said plurality of satellites at a known location exterior to said line-of-sight barrier, causing broadcast of said navigational data from a plurality of separate known locations, said broadcast of said navigational data distinguishable among each of said separate known locations, collecting the navigational data transmitted by said satellites, predicting or determining actual pseudoranges of said satellites, exporting the collected data and pseudoranges to a relational database, categorizing the data into appropriate fields of information, computing a position of said GPS receiver from said navigational data broadcast from said plurality of separate known locations by use of vector geometry.

10. A system for providing position and navigational information to a first unit which is separated by a line-of-sight barrier from a global navigational system, the global navigational system including a plurality of satellites orbiting the Earth which transmit navigational signals, the system comprising first antenna means mounted within the line of sight of at least three of said plurality of satellites for receiving navigational signals from said at least three of said satellites, a plurality of broadcast antennae disposed within the line of sight of said first unit and coupled to said first antenna means, each of said plurality of broadcast antennae disposed at a predetermined location, means for broadcasting of said received navigational signals from each of said broadcast antennae such that broadcast of said navigational signals by one of said broadcast antennae is distinguished from broadcast of said navigational signals by the others of said broadcast antennae, said first unit having a GPS receiver/processor associated therewith, said GPS receiver/processor capable of receiving said navigational signals, a host computer coupled to said GPS receiver/processor to receive said navigational signals received by said GPS receiver/processor, said first antenna means is coupled to a stationary receiver/processor, the stationary receiver/processor coupled to said host computer to communicate location information to said host computer, said host computer programmed to calculate location and navigation information of said first unit from said navigational signals received by said GPS receiver.

* * * * *